Aug. 20, 1940.          J. A. KRULISH          2,211,830
REAR SHUTTER HOUSING FOR MOTION PICTURE PROJECTORS
Filed July 16, 1938          2 Sheets-Sheet 1

INVENTOR.
John A. Krulish
BY Hastings W. Baker
ATTORNEYS.

Aug. 20, 1940.       J. A. KRULISH       2,211,830
REAR SHUTTER HOUSING FOR MOTION PICTURE PROJECTORS
Filed July 16, 1938       2 Sheets-Sheet 2

INVENTOR.
John A. Krulish
BY Hastings W. Baker
ATTORNEYS.

Patented Aug. 20, 1940

2,211,830

UNITED STATES PATENT OFFICE 2,211,830

REAR SHUTTER HOUSING FOR MOTION PICTURE PROJECTORS

John A. Krulish, Elmhurst, N. Y., assignor to International Projector Corporation, New York, N. Y., a corporation of Delaware Application July 16, 1938, Serial No. 219,586

7 Claims. (Cl. 88—19.3)

As is well known, motion picture projectors are provided with rotating shutters adapted to intermittently cut off the beam of light from a lamp house, which beam of light passes through the projector and through the film which is intermittently fed through the projector. The lamp house where the beam of light originates is very heavy and heretofore great difficulty has been experienced when it was necessary to remove the guard or the housing from the rear shutter because of the fact that the lamp house is immediately behind the same. This necessitated the laborious process of moving the lamp house before the rear shutter housing could be removed. The object of this invention is to eliminate this difficulty by making the housing in two sections, either of which sections may be removed laterally without disturbing the lamp house.

Other objects and advantages of the invention will appear in the detailed specification and claims which follow.

Figure 1:
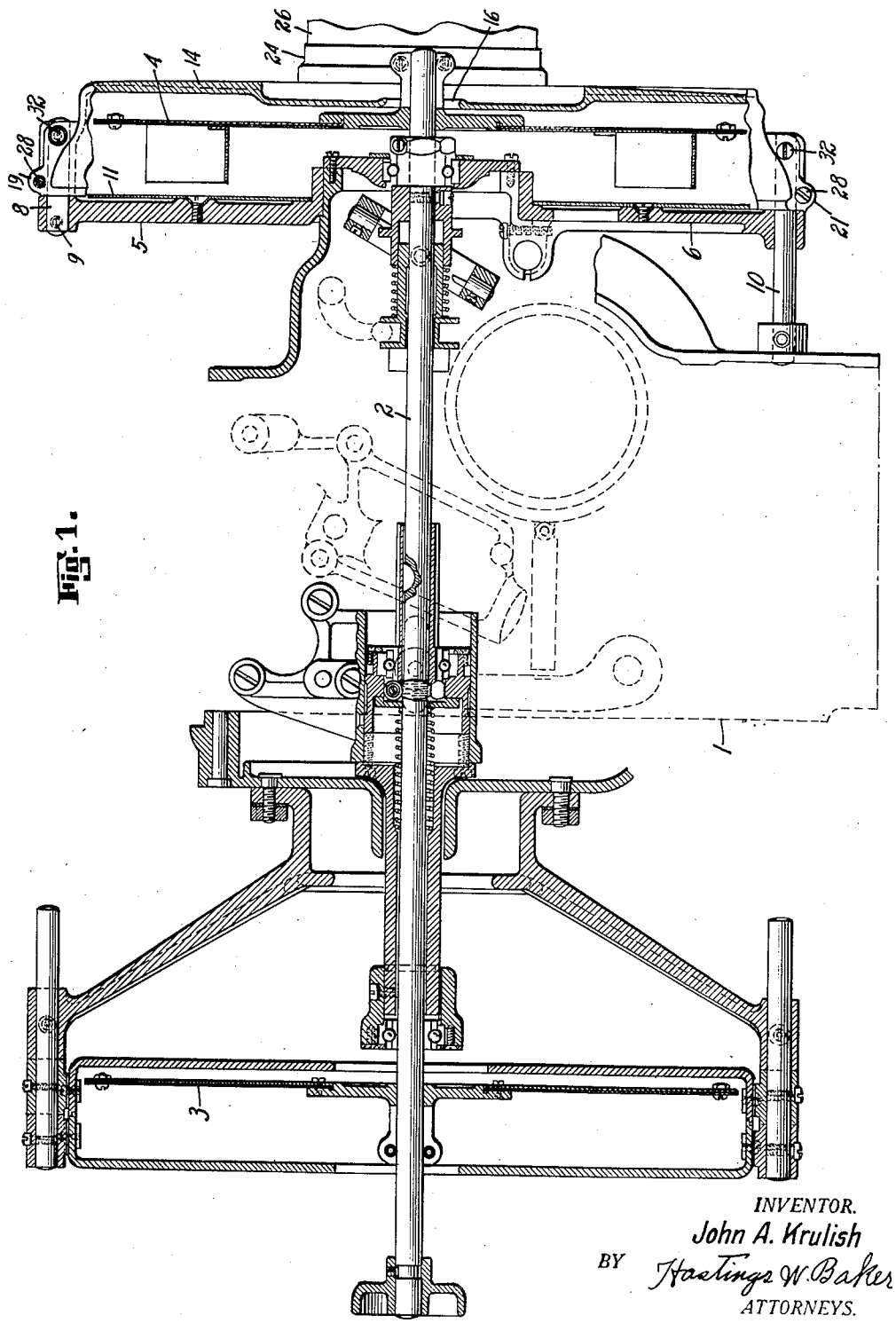
Figure 2:
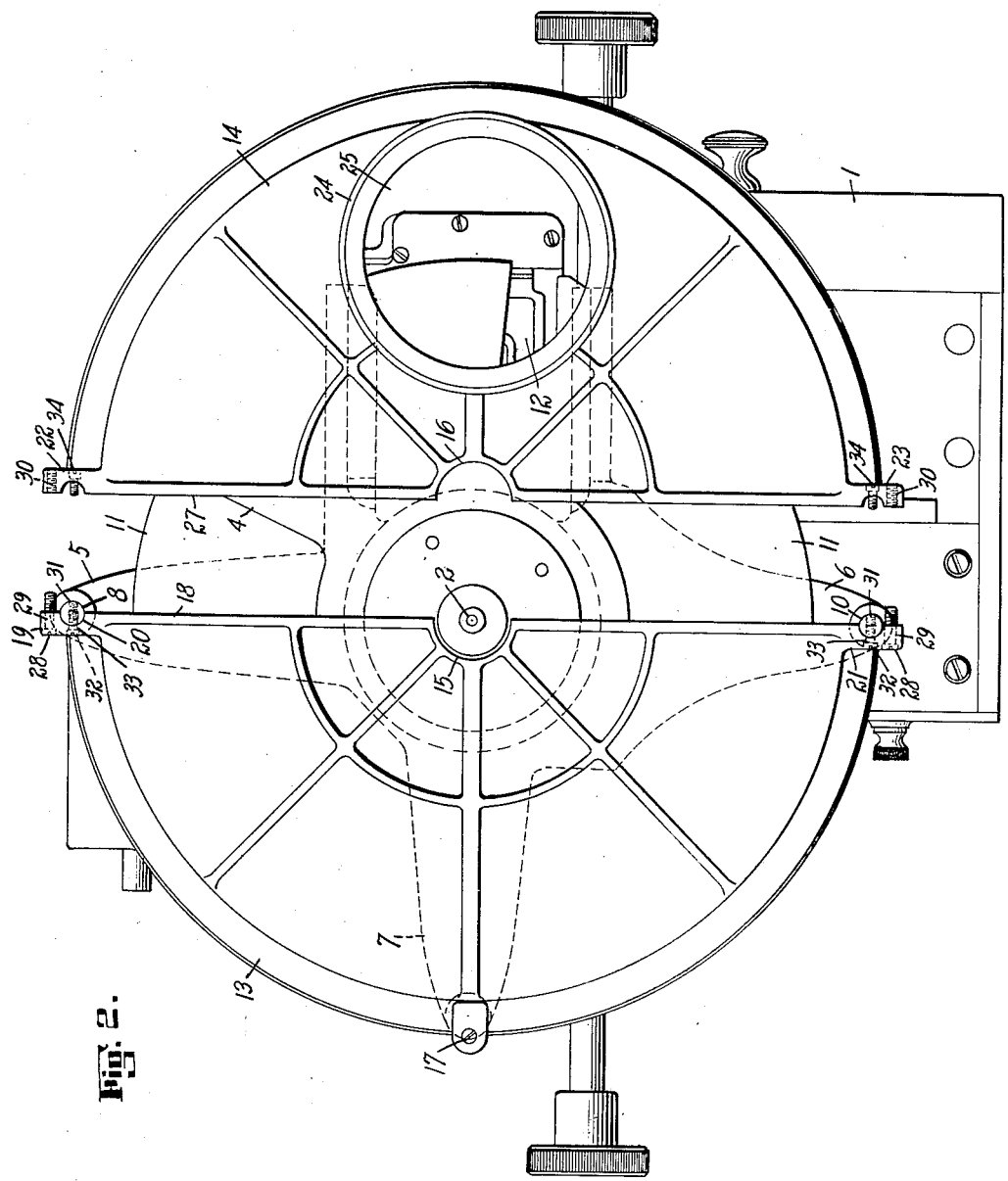

The invention may be better understood by referring to the attached drawings forming a part thereof in which, Fig. 1 is a vertical side elevational view of a projector partly in cross section and my improved rear shutter housing mounted thereon, and Fig. 2 is a view of the rear face of the rear shutter housing looking forwardly of the projector or from the right to the left as viewed in Fig. 1.

The projector 1 is provided with a rotating shutter shaft 2 provided with a front shutter 3 and a rear shutter 4. Secured to the projector is a frame consisting of an upwardly extending arm 5, a downwardly extending arm 6 and an arm 7 extending laterally in substantially the same horizontal plane as the shaft 2. The arm 5 carries a pin 8 which is secured in position by means of a screw 9. The downwardly extending arm 6 is provided with a pin 10 which pin also extends forwardly and is secured to the rear wall of the projector as is clearly shown in Fig. 1. The arms 5, 6, and 7 have secured thereto a plate 11 which is circular except that it is cut away adjacent the rectangular exposure aperture 12 so that light can pass through the said aperture. This plate 11 might be considered as the front part of the housing, but for the purposes of this description the said plate 11 is excluded and the housing is considered as the two removable sections which will now be described.

The housing consists of a semi-circular section 13 and a semi-circular section 14. The semi-circular section 13 is provided with a semi-circular central aperture 15 and the semi-circular section 14 is provided with a similar aperture 16, the two said apertures 15 and 16 forming a central hole through which the shaft 2 projects. The section 13 is secured to the arm 7 by means of the bolt 17. At its upper end adjacent the diametrical face 18 it is provided with an upstanding ear 19 provided with a semi-circular bore 20. The downwardly extending ear 21 is provided with a similar bore. The semi-circular section 14 is provided with an upstanding ear 22 and a downwardly extending ear 23. The ears 22 and 23 are constructed as the ears 19 and 21 except that they are oppositely facing so that the ears 19 and 22 might be considered as upwardly extending mating ears and the two semi-circular portions would form a circle when the two sections are brought together around the pin 8. Similarly the two downwardly extending ears 21 and 23 would be considered as downwardly extending mating ears and would embrace the pin 10 when the sections are brought together. The section 14 is provided with a light shield 24 through which extends a circular aperture 25 through which the light passes from the lamp house 26. It is to be noted that the lamp house is immediately adjacent the light shield so that the section 14 cannot be moved rearwardly without moving the lamp house.

In order to connect these two sections of the housing together so that the face 18 of the section 13 will abut against the face 27 of the section 14, the operator will move the two sections together laterally so that the pins 8 and 10 will be received in the respective semi-circular apertures in the ears. The screw 28 should then be passed through a hole 29 in the ear 19 and screwed into screw threads in the bore 30 in the ear 22. As will be noted, the screw 28 is above the pin 8. A similar screw is used below the pin 10 to connect the downwardly extending ears together. The pin 8 is provided with a threaded bore 31, which receives a screw 32 which passes through a bore 33 in the ear 19, thereby securing the ear 19 to the said pin 8. The screw 34 passes through a similar bore in the ear 22 and is screwed into the bore 31, thereby securing the ear 22 to the pin 8. The ears 21 and 23 are similarly secured to the pin 10.

It will be noted that if the operator desires to remove the section 14 he will unscrew the upper and lower screws 28 and then will unscrew the two upper and lower screws 34, thereby freeing the section 14 so that he can move it laterally without disturbing the lamp housing. If he also desires to move the section 13 he can remove it in the same manner after releasing the bolt 17.

I have, therefore, provided a practical rear shutter housing made in two sections, either or both of which may be removed without disturbing the lamp housing.

In some cases the lamp house may actually project a short distance within the shield 24 but in such a case no trouble is experienced in removing or reassembling the housing for when the fastening means are removed the right hand side of the section 14, as viewed in Fig. 2, may be tilted slightly forwardly so that the shield 24 no longer receives any portion of the lamp housing and the section 14 may then be moved laterally to remove it from the projector.

I realize that many changes may be made in the specific form of the invention as illustrated by way of example in this application, and I therefore reserve the right to make all changes which may fairly fall within the scope of the following claims.

Having now described my invention, I claim:

1. In a motion picture projector, a rear shutter, a rotatable shaft on which said shutter is secured, a circular housing for said shutter radially split to make two sections, supporting means carried by said projector and independent means to secure each of said sections to said supporting means so that either of said sections when said means are released may be independently and laterally removed.

2. In a motion picture projector a rear shutter, a rotatable shaft on which said shutter is secured, a circular housing for said shutter radially split to make two sections, supporting means carried by said projector, each of said sections being provided with a semi-circular central hole through which said shaft projects and independent means to secure each of said sections to said projector so that either of said sections when said means are released may be independently and laterally removed.

3. In a motion picture projector, a rear shutter, a rotatable shaft on which said shutter is secured, a housing for said shutter made in two semi-circular sections, two supporting arms carried by said projector, a pin carried by each of said arms, and means to secure each of said sections to said pins so that either of said sections when said means are released may be independently removed.

4. In a motion picture projector, a rear shutter, a rotatable shaft on which said shutter is secured, a housing split into two semi-circular sections, two fixed pins carried by said projector, one of said pins being above and the other below said shaft, ears on the extreme upper and lower ends of each of said sections adjacent the said split and adapted to receive said pins when the sections are put together, thereby forming two sets of mating ears and means to secure each of said sections independently on said pins.

5. In a motion picture projector, a rear shutter, a rotatable shaft on which said shutter is secured, a housing split into two semi-circular sections, two fixed pins carried by said projector, one of said pins being above and the other below said shaft, ears on the extreme upper and lower ends of each of said sections adjacent the said split and adapted to receive said pins when the sections are put together, thereby forming two sets of mating ears, means to secure each of said sections independently on said pins, and other means to secure the mating ears together.

6. In a motion picture projector, a rear shutter, a rotatable shaft on which said shutter is secured, a housing split into two semi-circular sections, two fixed pins carried by said projector, one of said pins being above and the other below said shaft, ears on the extreme upper and lower ends of each of said sections adjacent the said split and adapted to receive said pins when the sections are put together, thereby forming two sets of mating ears, a screw for each ear adapted to be screwed partly into its corresponding pin, and a screw adapted to pass through the mating ears to secure said sections together.

7. In a motion picture projector, a rear shutter, a housing therefor made in two mating sections, a lamp house positioned immediately behind said housing, each of said sections being provided with an upwardly and a downwardly extending ear and so positioned that when the sections are brought laterally together, the two upwardly extending ears will mate and the two downwardly extending ears will mate, rearwardly extending pins carried by said projector and adapted to pass through mating semi-circular holes in said ears, and laterally extending screws passing through said ears so that when said sections are moved together laterally without disturbing the lamp house, said screws may be screwed through said ears and into said pins carried by the said projector.

JOHN A. KRULISH.